United States Patent
Bauer et al.

(10) Patent No.: US 7,294,408 B2
(45) Date of Patent: Nov. 13, 2007

(54) MATERIAL COMPOSITE AND PRODUCTION AND USE OF THE MATERIAL COMPOSITE

(75) Inventors: Wolfgang Bauer, Redwitz (DE); Elisabeth Hügging, Küps-Au (DE); Jochen Jacobitz, Michelau (DE); Hellmuth Kiesewetter, Redwitz (DE); Wieland Mathes, Michelau (DE)

(73) Assignee: Siemens Aktiengesellschaft, Munich (DE)

( * ) Notice: Subject to any disclaimer, the term of this patent is extended or adjusted under 35 U.S.C. 154(b) by 426 days.

(21) Appl. No.: 10/296,824

(22) PCT Filed: May 28, 2001

(86) PCT No.: PCT/DE01/02018

§ 371 (c)(1),
(2), (4) Date: Aug. 25, 2003

(87) PCT Pub. No.: WO01/92184

PCT Pub. Date: Dec. 6, 2001

(65) Prior Publication Data

US 2004/0043225 A1    Mar. 4, 2004

(30) Foreign Application Priority Data

May 29, 2000   (DE) ............... 100 26 651

(51) Int. Cl.
*B32B 9/00*   (2006.01)
(52) U.S. Cl. ............ 428/469; 428/34.4; 428/701; 428/702; 257/107

(58) Field of Classification Search .......... None
See application file for complete search history.

(56) References Cited

U.S. PATENT DOCUMENTS 3,590,468 A   7/1971   Buck
4,892,498 A   1/1990   Gradl et al.

FOREIGN PATENT DOCUMENTS

| DE | 1963286 | * | 7/1971 |
| DE | 2307191 | | 8/1973 |
| DE | 37 39 628 A1 | | 6/1989 |
| DE | 195 02 006 A1 | | 8/1996 |
| EP | 0 327 049 | | 8/1989 |

* cited by examiner

Primary Examiner—Jennifer McNeil
Assistant Examiner—Timothy M. Speer
(74) Attorney, Agent, or Firm—Harness, Dickey & Pierce, P.L.C.

(57) ABSTRACT

A material composite that is vacuum-tight and resistant to thermal shocks is disclosed along with a method for the production thereof and to its use. A permanent connection between an aluminum oxide sapphire and an aluminum oxide ceramic is attained by a first connecting later comprised of a manganese-silicate glass, in which at least one of the metals molybdenum, tungsten, palladium or platinum is incorporated, and by a second connecting layer comprised of a manganese-silicate glass. To this end, the individual materials are fused by sintering. The material composite is used, for example, for inserting a window comprised of aluminum oxide sapphire into a housing for a light-ignitable thyristor.

28 Claims, 3 Drawing Sheets

MATERIAL COMPOSITE AND PRODUCTION AND USE OF THE MATERIAL COMPOSITE

This application is the national phase under 35 U.S.C. § 371 of PCT International Application No. PCT/DE01/02018 which has an International filing date of May 28, 2001, which designated the United States of America and which claims priority on German Patent Application number DE 100 26 651.7 filed May 29, 2000, the entire contents of which are hereby incorporated herein by reference.

FIELD OF THE INVENTION

The invention generally relates to a vacuum-tight and thermal shock-resistant material composite comprising an aluminum oxide sapphire and an aluminum oxide ceramic. The invention also generally relates to a process for producing this material composite and to a use thereof.

In this context, the term aluminum oxide sapphire is understood as meaning the crystalline corundum structure, with titanium dioxide impurities, of aluminum oxide ($\alpha$-$Al_2O_3$). By contrast, an aluminum oxide ceramic is understood as meaning a ceramic material which has been produced substantially by firing clays (aluminum silicates). This ceramic material includes, as its main constituent, aluminum oxide in the corundum modification which is incorporated in a vitreous phase. In addition, further metal oxides may be present in this ceramic.

BACKGROUND OF THE INVENTION

A transparent aluminum oxide ceramic is used, for example, in high-pressure gas discharge lamps, as described, for example, in EP-A-0 327 049 and DE-A-23 07 191. A metallic conductor has to be guided into the aluminum oxide ceramic, which is generally tubular and provided as a discharge vessel, and has to be connected to the aluminum oxide ceramic in a vacuum-tight manner. For this purpose, there is provision for a metallization paste to be sintered onto the aluminum oxide ceramic, so that a metal layer is obtained. The metallic conductor is then sealed to the metal layer in a vacuum-tight manner, for example by means of a brazing solder. U.S. Pat. No. 3,590,468 has described a process for forming a seal between a pure aluminum oxide and a metal. Therefore, the prior art has only disclosed a material composite comprising an aluminum oxide ceramic and a metal, but not a material composite comprising an aluminum oxide sapphire and an aluminum oxide ceramic.

SUMMARY OF THE INVENTION

Since the coefficients of thermal expansion of an aluminum oxide sapphire and of an aluminum oxide ceramic differ, it is extremely difficult to make a thermal shock-resistant, secure join between these two materials. A satisfactory, permanent and vacuum-tight join between the two materials mentioned above, which would be necessary, for example, for a transparent leadthrough into a vacuum, has not hitherto been disclosed in the prior art. Numerous tests have shown that all known joins between these materials are not permanent in the event of fluctuating thermal loads.

It is an object of an embodiment of the invention to provide a vacuum-tight and thermal shock-resistant material composite comprising an aluminum oxide sapphire and an aluminum oxide ceramic, in which the aluminum oxide sapphire is joined to the aluminum oxide ceramic securely and in such a manner as to withstand thermal shocks. Furthermore, it is an object of an embodiment of the invention to provide a process for producing a material composite of this type. Finally, another object of an embodiment of the invention is to provide a use of a material composite of this type.

According to an embodiment of the invention, the first object may be achieved by the fact that the aluminum oxide sapphire and the aluminum oxide ceramic are sintered to one another via a first joining layer and via a second joining layer, the first joining layer being adjacent to the aluminum oxide ceramic and comprising a manganese silicate glass which includes at least one of the metals selected from the group consisting of molybdenum, tungsten, palladium and platinum, and the second joining layer being adjacent to the aluminum oxide sapphire and comprising a manganese silicate glass. In this case, the manganese silicate glass of the first joining layer may contain aluminum oxide and/or titanium dioxide. The manganese silicate glass of the second joining layer contains aluminum oxide and/or titanium dioxide, the total content by weight of the oxides aluminum oxide and titanium oxide in the manganese silicate glass of the second joining layer being higher than in the manganese silicate glass of the first joining layer.

An embodiment of invention may be based on the consideration that by introducing metals into the manganese silicate glass it is possible to match the coefficient of thermal expansion of the first joining layer to the coefficient of thermal expansion of the aluminum oxide ceramic. The coefficient of thermal expansion of manganese silicate glass per se is in turn similar to the coefficient of thermal expansion of the aluminum oxide sapphire. To this extent, the first and second joining layers gradually match the coefficient of thermal expansion of the aluminum oxide sapphire to the coefficient of thermal expansion of the aluminum oxide ceramic. The stresses at the material joins which occur under fluctuating temperature loads are reduced.

Furthermore, extensive tests have now shown that by enriching the manganese silicate glass of the first joining layer with at least one of the abovementioned metals, during sintering onto the aluminum oxide ceramic fixed intermeshing and partial vitrification of the first joining layer to the aluminum oxide ceramic take place. Intermeshing and partial vitrification of the two joining layers also take place between the first joining layer and the second joining layer. The high glass content in the second joining layer results in a surface solid solution, i.e. a permanent chemical bond, being formed during sintering in the boundary layer between the aluminum oxide sapphire and the second joining layer.

As tests have shown, if the first joining layer is omitted, the aluminum oxide sapphire flakes off the aluminum oxide ceramic under fluctuating temperature loads. On the other hand, if the second joining layer is dispensed with, the aluminum oxide sapphire simply fails to adhere at all to the metal-enriched manganese silicate glass of the first joining layer.

If the aluminum oxide sapphire is sintered to the aluminum oxide ceramic via the first joining layer and via the second joining layer in the manner described, a material composite of this type will withstand fluctuating temperature loads within a wide range. It was impossible to detect any fracture in the material composite with fluctuating temperature loads between −60° C. and +200° C.

In an advantageous configuration of the invention, the sum of the contents of the metals in the manganese silicate glass of the first joining layer is 65 to 85% by weight. If the content of the said metals lies within this range the coefficient of thermal expansion of the first joining layer can be matched to the coefficient of thermal expansion of the aluminum oxide ceramic of the most widespread composition without the bonding of the first joining layer to the aluminum oxide ceramic being reduced.

Furthermore, it is advantageous if the manganese silicate glass of the first joining layer additionally comprises a content of up to 6% by weight of aluminum oxide and/or titanium dioxide. This type of content can further improve the joining of the first joining layer to the aluminum oxide ceramic.

In a further advantageous configuration, the manganese silicate glass of the second joining layer comprises a content of up to 30% by weight, in particular of 15 to 25% by weight, of aluminum oxide and/or titanium dioxide. The addition of a content of this level to the manganese silicate glass of the second joining layer allows the coefficient of thermal expansion of the second joining layer to be varied and to this extent allows the thermal shock resistance of the material composite to be optimized with regard to various levels of impurities in the aluminum oxide sapphire and with regard to a very wide range of compositions of the aluminum oxide ceramic.

The second object, relating to the production of the material composite referred to in the introduction, may be achieved, according to an embodiment of the invention, through the fact that a) a first screen-printing paste is produced by a1) mixing the powder of a first manganese silicate glass with a powder of at least one of the metals selected from the group consisting of molybdenum, tungsten, palladium and platinum, to form a powder mixture, and a2) combining the powder mixture with a suspending agent and/or with an adhesive, that b) a second screen-printing paste is produced by b1) combining a powder of a manganese silicate glass, which contains a higher level of aluminum oxide and/or titanium dioxide than the first manganese silicate glass, with a suspending agent and/or with an adhesive, that c) a sequence of materials comprising aluminum oxide ceramic, first joining layer, second joining layer, the aluminum oxide sapphire is produced by screen-printing the first screen-printing paste and the second screen-printing paste, and that, finally, d) a firing operation takes place at 1200 to 1500° C.

The powder of the manganese silicate glass can either be obtained commercially as a finished product or can be produced by mixing the powders of Braunstein $MnO_2$ and silica solidifying the molten material and finally milling the solidified molten material itself. The proportions by weight in the powder mixture are 55-63% of $MnO_2$ and 45-37% of $SiO_2$.

During the production of the powder mixture for the first screen-printing paste, the powders of the manganese silicate glass and at least one of the abovementioned metals are intimately mixed to form the powder mixture.

The addition of a suspending agent and/or an adhesive to the powder mixture or to the powder is necessary in order to be able to produce a screen-printing paste which can be screen printed from the powders. Screen printing makes it simple to achieve uniform application with a defined layer thickness of the subsequent interlayers. To produce the material composite, first of all the first screen-printing paste and then the second screenprinting paste can be applied to the aluminum oxide ceramic by screen printing. Finally, the aluminum oxide sapphire is placed on top and the layer sequence which has been formed in this way is fired, i.e. sintered, at 1200 to 1500° C. Of course, the reverse order of process sequences is also possible, i.e. first of all the second screen-printing paste and then the first screen-printing paste are applied to the aluminum oxide sapphire, and then the aluminum oxide ceramic is placed on top. However, since in a material composite of this type the aluminum oxide ceramic is generally the larger workpiece rather than the aluminum oxide sapphire, the procedure which was outline first is generally easier to implement.

In addition to the advantages which have already been outlined in connection with the specific contents by weight of the metals or of aluminum oxide and titanium oxide (for which a titanium hydride can also be used as starting substance) which have been mentioned in patent claims 6 to 8, with regard to the process it is furthermore advantageous if, after the screen printing with the first screen-printing paste and/or after the screen printing with the second screen-printing paste, in each case a separate firing operation takes place at 1200 to 1500° C. In this way, it is possible to avoid solvent effects between the two screen-printing pastes which have been applied.

With a view to processing, it is advantageous if a powder with a mean grain size of less than 10 µm, in particular of less than 2 µm, is used for the powder of the manganese silicate glass.

Furthermore, for the same reason it is advantageous if the powder of one or more of the abovementioned metals is used with a mean grain size of less than 15 µm, in particular less than 5 µm.

Furthermore, with regard to the screen-printing paste it is advantageous if vegetable oil or terpineol oil is used as suspending agent. Ethylcellulose has proven advantageous as the adhesive. The abovementioned additives are commercially available and the firing operation does not produce any decomposition products which are harmful to the environment.

With regard to the durability and thermal shock resistance of the material composite, it has proven expedient if the first screen-printing paste is applied in a thickness of from 2 to 20 µm and the second screen-printing paste is applied in a thickness of from 2 to 200 µm.

According to an embodiment of the invention, the final object is achieved by the fact that the material composite is used to insert a window made from the aluminum oxide sapphire into a housing for a light-triggerable thyristor. As the name would suggest, a light-triggerable thyristor is switched or triggered not by a voltage signal but rather by light. A thyristor is generally used to switch high currents. A thyristor as what is known as a power semiconductor is for this purpose generally inserted between two metallic contact pieces into a housing with a surrounding wall made from an insulating aluminum oxide ceramic. The aluminum oxide ceramic is used to electrically isolate the high electric voltage which is present at the two poles of the thyristor, i.e. at the two metallic contact pieces. The interior of the housing is generally evacuated.

For a light-triggerable thyristor which is fitted in a housing of this type, there is now the problem of introducing light through the housing to the light-sensitive point in the thyristor. In this context, a window of an aluminum oxide sapphire arranged in the housing is recommended for this introduction of light, an optical waveguide being led to the window from the outside. Since the housing is evacuated in the interior and, in addition, after insertion of the thyristor one or both of the abovementioned contact pieces has to be soldered to the wall made from aluminum oxide ceramic, the material composite formed between the window made from the aluminum oxide sapphire and the housing has to be permanent, strong, vacuum-tight and resistant to thermal shocks. For this reason, the material composite described is recommended in particular for this type of use.

For this use, the window made from the aluminum oxide sapphire is advantageously inserted into the partial area of the housing which consists of aluminum oxide ceramic. For this purpose, the window, at its edge regions, is fixedly sintered to the aluminum oxide ceramic via the first joining layer and the second joining layer in the manner described above.

In a further advantageous configuration of the use, the window is inserted into a partial area of the housing which includes a first metal. This partial area may, for example, be one of the abovementioned metallic contact pieces. For this purpose, the window, at its edge regions, is fixedly joined to a first piece of material made from aluminum oxide ceramic via the first joining layer and the second joining layer, and the first piece of material is fixedly soldered to the first metal of the partial area of the housing via a metal solder. In this case, therefore, the material composite is used to join the window made from the aluminum oxide sapphire to the first metal of the partial area of the housing. The join between the aluminum oxide ceramic of the first piece of material and the first metal of the partial area of the housing is known per se and corresponds to the method in which the metallic partial area of the housing or the metallic contact pieces of the housing are soldered to the surrounding wall made from the aluminum oxide ceramic.

In a further advantageous configuration of the use, the aluminum oxide ceramic of the first piece of material is fixedly joined to a second piece of material made from a second metal via a metal solder, and the second piece of material is soldered to the first metal of the partial area of the housing via a metal solder. In this way, the coefficients of thermal expansion of the window made from the aluminum oxide sapphire and of the first metal of the partial area of the housing are compensated for via the first and second pieces of material. The first and second pieces of material produce a gradual transition from the coefficient of thermal expansion of the aluminum oxide sapphire to the coefficient of thermal expansion of the first metal.

A particularly suitable metal solder is a eutectic silver/copper solder (L-Ag72, DIN 8513), although it is also possible to use a different solder.

The metallic contact pieces of a housing for receiving a power semiconductor are generally made from copper. With a view to achieving good soldering between the second piece of material and the metallic partial area of the housing, it is advantageous if the second metal is a nickel/iron alloy.

In a further advantageous configuration of the use, the first and second pieces of material are joined to one another at an angle which is such that differences in length between the partial area made from the first metal and the window made from the aluminum oxide sapphire which occur as the result of temperature changes are compensated for by relative movements of the first piece of material and of the second piece of material with respect to one another, substantially without any load on the joins.

The "angled join" results in the formation of a lever structure which allows relative movements of the first and second pieces of material with respect to one another. Differences in length which occur in the event of fluctuating temperature loads on account of the different coefficients of thermal expansion of aluminum oxide sapphire and metal are then compensated for as a result of relative movements of the first and second pieces of material with respect to one another. The joining of the window to the metal of the metallic partial area itself is exposed to lower mechanical loads. As a result, the join between the window made from the aluminum oxide sapphire and the metal of the metallic partial area of the housing is able to withstand even high loads caused by fluctuating temperatures, which occur in particular when the metallic partial areas are soldered to the partial areas of the housing made from aluminum oxide ceramic.

BRIEF DESCRIPTION OF THE DRAWINGS

Exemplary embodiments of the invention are explained in more detail with reference to the drawings, in which.

DETAILED DESCRIPTION OF THE PREFERRED EMBODIMENTS

Figure 1:
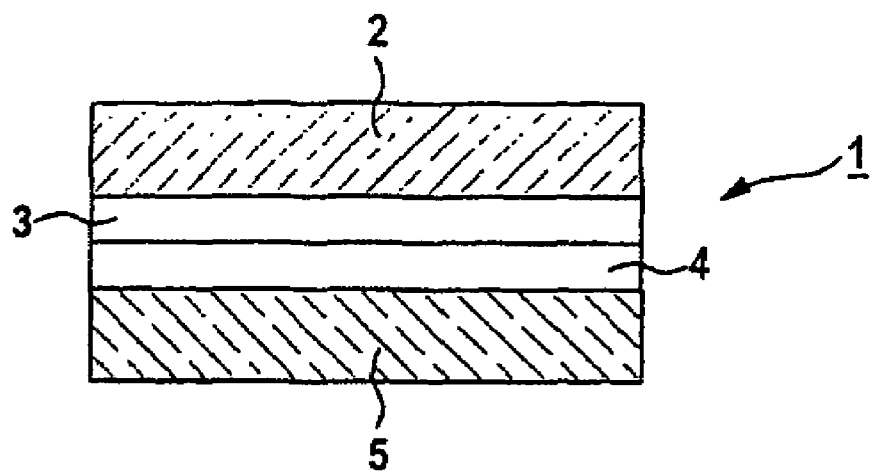
FIG. 1 shows a section through a material composite comprising an aluminum oxide sapphire and an aluminum oxide ceramic, FIG. 2 diagrammatically depicts the process for producing a material composite as shown in FIG. 1.

FIG. 1 shows a section through a material composite 1 including an aluminum oxide ceramic 5 which is joined to an aluminum oxide sapphire 2 via a first joining layer 3 and a second joining layer 4. The first joining layer 3 comprises a manganese silicate glass which has 70% by weight of included molybdenum. The second joining layer 4 likewise comprises a manganese silicate glass, but it has 20% by weight of included aluminum oxide. The material composite 1 illustrated has been produced by sintering the individual materials to one another. Both intermeshing of the materials and partial vitrification of the materials occurs between the aluminum oxide sapphire 2 and the second joining layer 4 and between the first joining layer 3 and the second joining layer 4. After the sintering operation, the aluminum oxide ceramic 5 has been securely joined to the first joining layer 3 via a surface solid solution which has formed.

Figure 2:
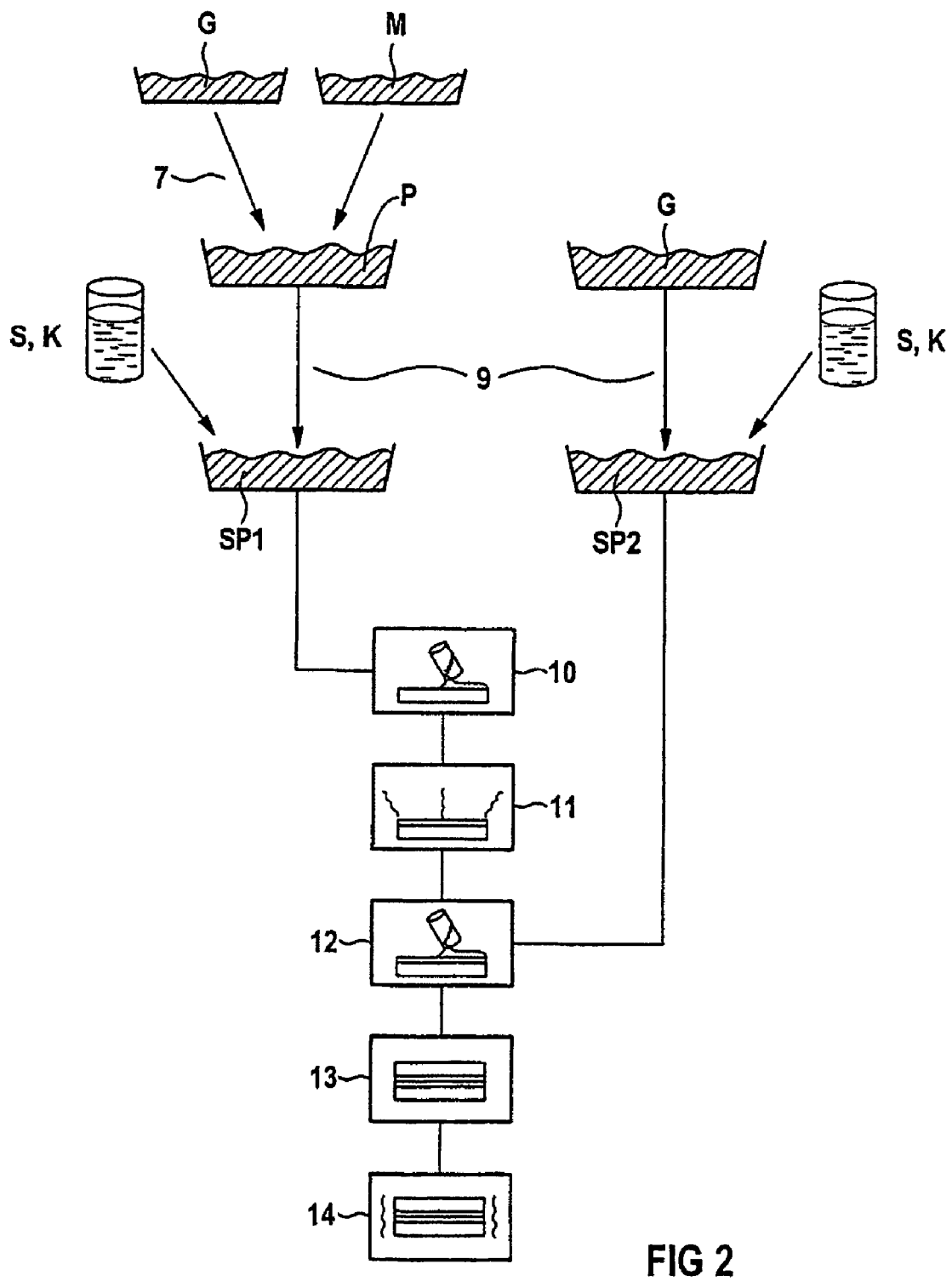

FIG. 2 diagrammatically depicts the process used to produce a material composite as shown in FIG. 1. In this process, first of all a powder G of a manganese silicate glass and a powder M of one or more of the refractory metals molybdenum, tungsten, palladium or platinum are provided. A powder mixture P is produced by mixing and screening the powders G and M. Since the powder of a manganese silicate glass is commercially available, the production of this powder is not illustrated in more detail. However, as has already been mentioned, a powder of this type can be produced from Braunstein $MnO_2$ and crystalline silicon dioxide $SiO_2$.

A first screen-printing paste SP1 is produced by combining 9 the powder mixture P with a suspending agent S and adhesive K. Furthermore, a second screen-printing paste SP2 is produced by combining the powder G of the manganese silicate glass with a suspending agent S and adhesive K.

The first screen-printing paste SP1 is applied to an aluminum oxide ceramic by means of screen printing 10. Then, the aluminum oxide ceramic with the applied first screen-printing paste SP1 is fired 11 at a temperature of 1300° C. Following this firing operation 11, the second screen-printing paste SP2 is applied 12, by use of screen printing, to the first joining layer which has been produced from the first screen-printing paste SP1 as a result of the firing operation 11. Then, the aluminum oxide sapphire is placed on top, 13.

The sequence of materials which has formed is finally sintered together by a final firing operation 15, once again carried out at 1300° C.

Figure 3:
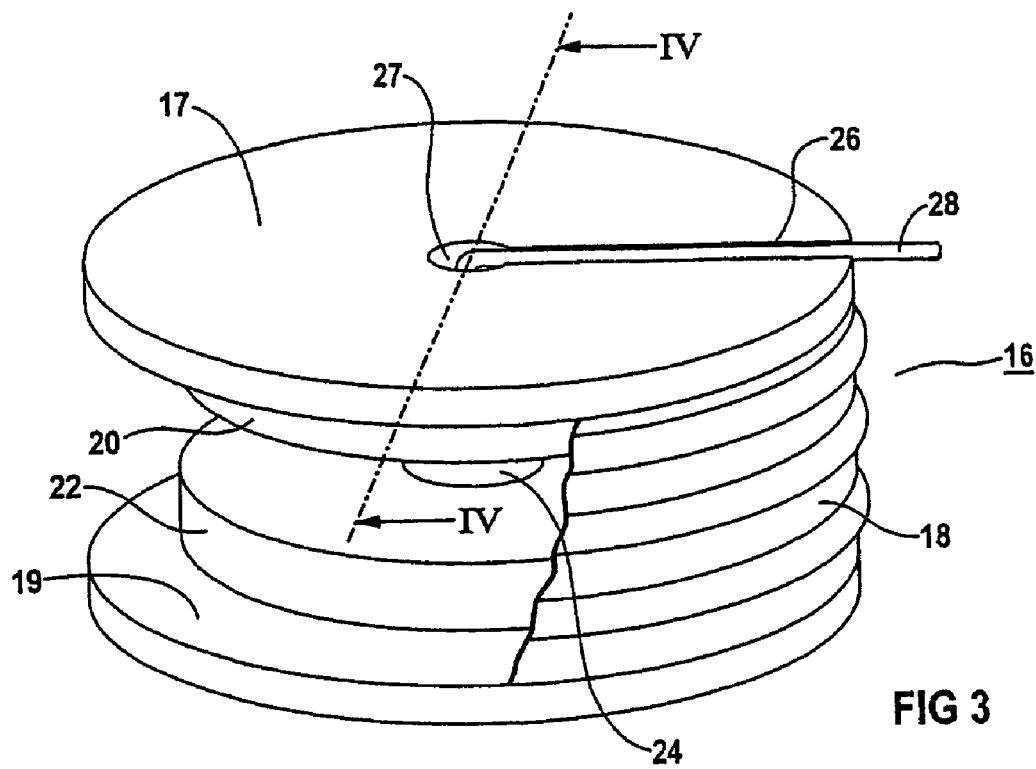
FIG. 3 shows a partially cut-away, perspective illustration of a housing for a light-triggerable thyristor having a window for light to pass through which is inserted into a metallic contact piece.

FIG. 3 shows a perspective, partially cut-away illustration of a housing 16 for a power semiconductor. The housing 16 has a metallic housing cover 17, which is electrically insulated from a metallic housing base 19 by an insulating wall 18. The housing cover 17 and the housing base 19 are made from copper, the surface of which is nickel-plated. Both the housing cover 17 and the housing base 19 are each formed of a metallic contact piece and for this purpose each have at thickened portion 20 and 22, respectively, which projects into the interior of the housing and is used to receive the power semiconductor. A light-triggerable thyristor 24 is clamped between housing cover 17 and housing base 19 via the thickened portions 20 and 22 as the power semiconductor. The insulating wall 18 is made from aluminum oxide ceramic in order to provide voltage isolation of housing cover 17 with respect to the housing base 19.

To trigger the light-triggerable thyristor 24, the housing cover 17 has a bore 27 into which (not visible in FIG. 3) a window made from an aluminum oxide sapphire has been inserted. An optical waveguide 28, the output of which ends before the window of aluminum oxide sapphire which has been inserted into the bore 27, is guided via a recess 26 formed in the housing cover 17. The light which emerges from the optical waveguide 28 passes via the window made from the aluminum oxide sapphire into the interior of the housing 16, where it is incident on the light-sensitive point of the light-triggerable thyristor 24. The emission of a light pulse via the optical waveguide 28 in this way switches the light-triggerable thyristor 24.

Figure 4:
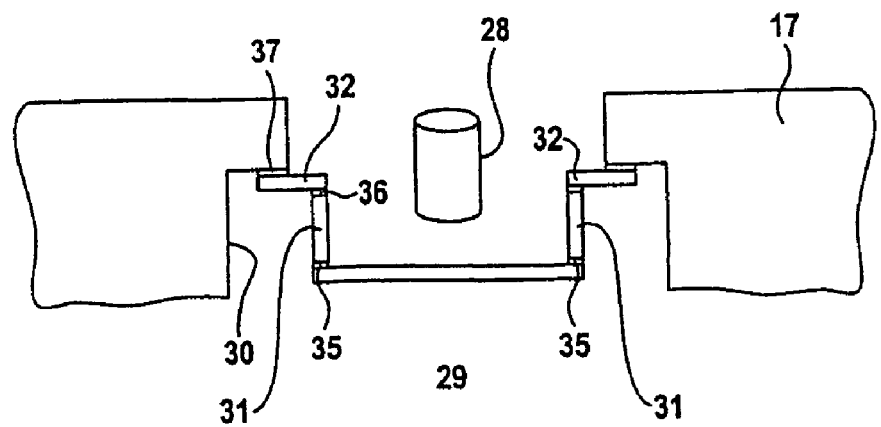
FIG. 4 shows a section corresponding to that shown in FIG. 3 illustrating the joining of the inserted window made from aluminum oxide sapphire to the metallic contact piece.

FIG. 4 shows an enlarged view of part of the section on line IV-IV in FIG. 3. The housing cover 17 with the introduced bore 27 is visible once again. The output of the optical waveguide 28, which ends in the immediate vicinity of the window 29 made from aluminum oxide sapphire, is also visible.

Toward the interior of the housing, the bore 27 has a recess 30 with a larger diameter in order to receive the securing materials for the window 29. The window 29 made from the aluminum oxide sapphire is designed as a disk which at the edge regions is joined to a hollow-cylindrical first piece of material 31 made from an aluminum oxide ceramic. The first piece of material 31 made from the aluminum oxide ceramic is in turn soldered to the housing cover 17 via a disk-like second piece of material 32 made from a nickel/iron alloy.

The window 29 made from the aluminum oxide sapphire is fixedly joined (not illustrated in more detail in FIG. 4) via a first and a second joining layer 35 to the first piece of material in accordance with the material composite shown in FIG. 1. The first piece of material 31 made from the aluminum oxide ceramic is in turn soldered via a metal solder 36 to the piece of material 32 made from the nickel/iron alloy. Finally, the second piece of material 32 is soldered via a metal solder 37 to the housing cover 17. The metal solder used is in each case a silver/copper solder.

The window 29 made from the aluminum oxide sapphire has a thickness of 0.55 mm. The hollow-cylindrical first piece of material 31 has a wall thickness of 1.3 mm. The disk-like second piece of material in turn is approximately 0.25 mm thick. The nickel/iron alloy which is commercially available under the name Vacodil from Vakuumschmelze Hanau was used as the nickel/iron alloy of the second piece of material.

Joining the first piece of material 31 at an angle to the second piece of material 32 allows a relative movement of the two pieces of material 31, 32 in the event of a reduction or increase in the diameter of the bore 27 in the event of fluctuating temperature loads on the housing cover 17. In this way, the different coefficient of thermal expansion of the window 29 than the metal of the housing cover 17 is compensated for. The join between the window 21 made from aluminum oxide sapphire and the housing cover 17 remains vacuum-tight and secure, even if the housing cover is soldered to the insulating wall 18 at a soldering temperature of approx. 600° C.

The use of the material composite shown in FIG. 1 for inserting the window 29 made from the aluminum oxide sapphire into the housing cover 17 of a housing for a light-triggerable thyristor for the first time allows a permanent, vacuum-tight and thermal shock-resistant join between the window 29 and the housing cover 17 and therefore the introduction of light via a window into the interior of the housing. In this way, it is possible to dispense with complex vacuum-tight leadthroughs for guiding the optical waveguide into the evacuated interior of the housing.

Figure 5:
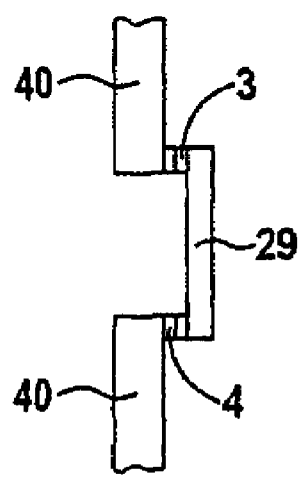
FIG. 5 shows a section illustrating a window made from aluminum oxide sapphire which has been inserted into an aluminum oxide ceramic of a surrounding insulating wall of a housing for a light-triggerable thyristor.

Finally, FIG. 5 shows the use of the material composite shown in FIG. 1 for direct insertion of the window 29 made from the aluminum oxide sapphire into the insulating wall 18 made from the aluminum oxide ceramic. For this purpose, the insulating wall 18 is flattened at a suitable point and the window is inserted 29 at this point.

FIG. 5 clearly shows the aluminum oxide ceramic 40 of the insulating wall 18 of the housing 16 shown in FIG. 3. The aluminum oxide ceramic 40 has been sintered to the window 29 made from the aluminum oxide sapphire via a first joining layer 3 and a second joining layer 4, as described in the description associated with FIG. 1. Even with a use of this type, the material composite shown in FIG. 1 allows a reliable, vacuum-tight and thermal shock-resistant joining of the window 29 made from the aluminum oxide sapphire to the aluminum oxide ceramic of the insulating wall 18 of the housing 16. In this relatively simple way, it is once again possible to eliminate the need for a complex leadthrough passing the optical waveguide into the interior to the light-sensitive area of the light-triggerable thyristor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A vacuum-tight and thermal shock-resistant material composite, comprising:
   an aluminum oxide sapphire and an aluminum oxide ceramic, comprising aluminum oxide in a corundum modification included in a vitreous phase, sintered to one another via a first joining layer and via a second joining layer, wherein the first joining layer is adjacent to the aluminum oxide ceramic and comprises a first manganese silicate glass which includes at least one of the metals selected from the group consisting of molybdenum, tungsten, palladium and platinum, and wherein the second joining layer is adjacent to the aluminum oxide sapphire and comprises a second manganese silicate glass containing aluminum oxide and titanium oxide in a relatively higher proportion by weight than the first manganese silicate glass.

2. The material composite as claimed in claim 1, wherein the sum of the contents of the metals in the first manganese silicate glass is 65 to 85% by weight.

3. The material composite as claimed in claim 2, wherein the first manganese silicate glass comprises a content of up to 6% by weight of at least one of aluminum oxide and titanium dioxide.

4. The material composite as claimed in claim 2, wherein the second manganese silicate glass comprises a content of up to 30% by weight of at least one of aluminum oxide and titanium dioxide.

5. The material composite as claimed in claim 2, wherein the second manganese silicate glass comprises a content of from 15 to 25% by weight of at least one of aluminum oxide and titanium dioxide.

6. The material composite as claimed in claim 1, wherein the first manganese silicate glass comprises a content of up to 6% by weight of at least one of aluminum oxide and titanium dioxide.

7. The material composite as claimed in claim 6, wherein the second manganese silicate glass comprises a content of up to 30% by weight of at least one of aluminum oxide and titanium dioxide.

8. The material composite as claimed in claim 6, wherein the second manganese silicate glass comprises a content of from 15 to 25% by weight of at least one of aluminum oxide and titanium dioxide.

9. The material composite as claimed in claim 1, wherein the second manganese silicate glass comprises a content of up to 30% by weight of at least one of aluminum oxide and titanium dioxide.

10. The material composite as claimed in claim 1, wherein the second manganese silicate glass comprises a content of from 15 to 25% by weight of at least one of aluminum oxide and titanium dioxide.

11. A method for inserting a window into a housing for a light-triggerable thyristor, wherein the window is made from the aluminum oxide sapphire and inserted using the material composite according to claim 1.

12. The method as claimed in claim 11, wherein the housing comprises a partial area of aluminum oxide ceramic, in which the window is inserted, and into which the window, at its edge regions, is fixedly joined to the aluminum oxide ceramic via the first joining layer and the second joining layer.

13. The method as claimed in claim 11, wherein the housing comprises a partial area made from a first metal, into which the window is inserted, in which the window, at its edge regions, is fixedly joined to a first piece of material made from aluminum oxide ceramic via the first joining layer and the second joining layer, and in which the first piece of material is fixedly soldered to the first metal of the partial area of the housing via a metal solder.

14. The method as claimed in claim 11, wherein the housing comprises a partial area made from a first metal, into which the window is inserted, in which the window, at its edge regions, is fixedly joined to a first piece of material made from aluminum oxide ceramic via the first joining layer and the second joining layer, in which the first piece of material is fixedly joined to a second piece of material made from a second metal via a metal solder, and in which the second piece of material is soldered to the first metal of the partial area of the housing via a metal solder.

15. The method as claimed in claim 14, wherein copper is used as the first metal and a nickel/iron alloy is used as the second metal.

16. A method for inserting a window into a housing for a light-triggerable thyristor, wherein the window is made from the aluminum oxide sapphire and inserted using the material composite according to claim 2.

17. A method inserting a window into a housing for a light-triggerable thyristor, wherein the window is made from the aluminum oxide sapphire and inserted using the material composite according to claim 6.

18. A method for inserting a window into a housing for a light-triggerable thyristor, wherein the window is made from the aluminum oxide sapphire and inserted using the material composite according to claim 9.

19. A housing for a light-triggerable thyristor, comprising a window made from the aluminum oxide sapphire, inserted using the material composite as claimed in claim 1.

20. The housing as claimed in claim 19, wherein the housing comprises a partial area of aluminum oxide ceramic, in which the window is inserted, and into which the window, at its edge regions, is fixedly joined to the aluminum oxide ceramic via the first joining layer and the second joining layer.

21. The housing as claimed in claim 19, wherein the housing comprises a partial area made from a first metal, into which the window is inserted, in which the window, at its edge regions, is fixedly joined to a first piece of material made from aluminum oxide ceramic via the first joining layer and the second joining layer, and in which the first piece of material is fixedly soldered to the first metal of the partial area of the housing via a metal solder.

22. The housing as claimed in claim 19, wherein the housing comprises a partial area made from a first metal, into which the window is inserted, in which the window, at its edge regions, is fixedly joined to a first piece of material made from aluminum oxide ceramic via the first joining layer and the second joining layer, in which the first piece of material is fixedly joined to a second piece of material made from a second metal via a metal solder, and in which the second piece of material is soldered to the first metal of the partial area of the housing via a metal solder.

23. The housing as claimed in claim 22, wherein copper is used as the first metal and a nickel/iron alloy is used as the second metal.

24. A housing for a power semiconductor, comprising a light-triggerable thyristor including a window made from the aluminum oxide sapphire, inserted using the material composite as claimed in claim 1.

25. The housing as claimed in claim 24, wherein the housing comprises a partial area of aluminum oxide ceramic, in which the window is inserted, and into which the window, at its edge regions, is fixedly joined to the aluminum oxide ceramic via the first joining layer and the second joining layer.

26. The housing as claimed in claim 24, wherein the housing comprises a partial area made from a first metal, into which the window is inserted, in which the window, at its edge regions, is fixedly joined to a first piece of material made from aluminum oxide ceramic via the first joining layer and the second joining layer, and in which the first piece of material is fixedly soldered to the first metal of the partial area of the housing via a metal solder.

27. The housing as claimed in claim 24, wherein the housing comprises a partial area made from a first metal, into which the window is inserted, in which the window, at its edge regions, is fixedly joined to a first piece of material made from aluminum oxide ceramic via the first joining layer and the second joining layer, in which the first piece of material is fixedly joined to a second piece of material made from a second metal via a metal solder, and in which the second piece of material is soldered to the first metal of the partial area of the housing via a metal solder.

28. The housing as claimed in claim 27, wherein copper is used as the first metal and a nickel/iron alloy is used as the second metal.

* * * * *